US009718625B2

(12) United States Patent
Huang

(10) Patent No.: US 9,718,625 B2
(45) Date of Patent: Aug. 1, 2017

(54) AUTOMATICALLY CYCLING DETECTING-AND-SORTING DEVICE

(71) Applicant: Greatquo Technology Co., Ltd., Taoyuan (TW)

(72) Inventor: Jen-Yung Huang, Taoyuan (TW)

(73) Assignee: GREATQUO TECHNOLOGY CO., LTD. (TW)

(*) Notice: Subject to any disclaimer, the term of this patent is extended or adjusted under 35 U.S.C. 154(b) by 0 days.

(21) Appl. No.: 14/947,976

(22) Filed: Nov. 20, 2015

(65) Prior Publication Data

US 2017/0144842 A1 May 25, 2017

(51) Int. Cl.
*B65G 29/00* (2006.01)
*B65G 45/24* (2006.01)
(Continued)

(52) U.S. Cl.
CPC .......... *B65G 45/24* (2013.01); *B65G 43/10* (2013.01); *B65G 47/32* (2013.01); *B65G 47/38* (2013.01); *B65G 47/82* (2013.01)

(58) Field of Classification Search
CPC ........ B65G 45/24; B65G 43/10; B65G 47/32; B65G 47/38; B65G 47/82; B65G 25/04; B65G 25/08
(Continued)

(56) References Cited

U.S. PATENT DOCUMENTS 2,999,579 A * 9/1961 Kostrzewa ........... B23Q 7/1489
198/736
3,791,518 A 2/1974 Vanderhoof
(Continued)

FOREIGN PATENT DOCUMENTS

EP 0686585 A2 12/1995
EP 0741079 A2 11/1996
(Continued)

OTHER PUBLICATIONS

Search Report issued by the Intellectual Property Office of Singapore (IPOS) on Dec. 15, 2015 in related Singapore Patent Application No. 10201509804P.
Written Opinion of IPOS issued on Jan. 7, 2016 in related Singapore Patent Application No. 10201509804P.
European Search Report dated May 20, 2016 in related Application No. EP 15196049.9.
Report of Technical Opinion dated Apr. 21, 2016 in related Japanese Application JP 2015-006375.
(Continued)

*Primary Examiner* — William R Harp
(74) *Attorney, Agent, or Firm* — Hershkovitz & Associates, PLLC; Abe Hershkovitz

(57) ABSTRACT

An automatically cycling detecting-and-sorting device has a base, multiple accommodating elements, at least one pushing rod, multiple side rods, and a detector. An object under inspection is put in one of the accommodating elements, and the accommodating element is conveyed along a first channel of the base and is under detection of the detector. The accommodating element is conveyed to the discharging region and then conveyed back to the feeding region, or the accommodating element is pushed away and then conveyed back to the feeding region. Because each object under inspection is accommodated in an individual accommodating element, even though any object in the accommodating element fails to pass the detection, the disqualified accommodating element is pushed away individually without affecting the processing of other accommodating elements. The whole detecting, sorting and cycling proceed automatically.

8 Claims, 8 Drawing Sheets

(51) Int. Cl.
  *B65G 43/10* (2006.01)
  *B65G 47/32* (2006.01)
  *B65G 47/38* (2006.01)
  *B65G 47/82* (2006.01)

(58) Field of Classification Search
  USPC ...... 198/468.11, 370.02, 370.07, 465.1, 358, 198/580, 795
  See application file for complete search history.

(56) References Cited

U.S. PATENT DOCUMENTS

| | | | | |
|---|---|---|---|---|
| 3,905,758 A * | 9/1975 | Moussou | ............... | F27B 9/02 |
| | | | | 198/465.1 |
| 3,982,888 A * | 9/1976 | Moussou | ............... | F27B 9/023 |
| | | | | 414/431 |
| 4,875,572 A * | 10/1989 | Kiriake | ............... | D01H 9/187 |
| | | | | 198/744 |
| 4,972,937 A * | 11/1990 | Aarts | ............... | B65G 35/08 |
| | | | | 198/465.2 |
| 5,018,073 A * | 5/1991 | Goldberg | ............... | B07C 5/361 |
| | | | | 209/563 |
| 5,101,983 A | 4/1992 | Scata | | |
| 2002/0009217 A1 | 1/2002 | Bickert et al. | | |
| 2003/0127372 A1 | 7/2003 | Kenneway | | |
| 2003/0155285 A1 * | 8/2003 | Heitzer | ............... | B07C 5/362 |
| | | | | 209/653 |
| 2003/0222002 A1 | 12/2003 | Meyer et al. | | |
| 2007/0251801 A1 | 11/2007 | Garvey | | |
| 2007/0251806 A1 | 11/2007 | Paguin et al. | | |
| 2007/0261936 A1 | 11/2007 | Garvey | | |
| 2012/0118699 A1 | 5/2012 | Buchmann et al. | | |

FOREIGN PATENT DOCUMENTS

| | | |
|---|---|---|
| JP | 1989-140360 | 9/1989 |
| JP | 1994-191736 | 7/1994 |
| JP | 1988-143116 | 6/1998 |
| JP | 2002-114369 A | 4/2002 |
| JP | 2002-522784 A | 7/2002 |
| WO | WO 02/42012 A1 | 5/2002 |
| WO | WO 2010/012364 A1 | 2/2010 |

OTHER PUBLICATIONS

English language Abstract of JP 1994-191736 published on Jul. 12, 1994.
English language Abstract of JP 2002-522784 A published on Jul. 23, 2002.
English language Abstract of JP 1988-143116 published on Jun. 15, 1998.
English language Abstract of JP 1989-140360 published on Sep. 26, 1989.
English language Abstract of JP 2002-114369 A published on Apr. 16, 2002.

* cited by examiner

AUTOMATICALLY CYCLING DETECTING-AND-SORTING DEVICE

BACKGROUND OF THE INVENTION

1. Field of the Invention

The present invention relates to an automatically cycling detecting-and-sorting device for curved and transparent objects, especially to a device for sorting contact lenses.

2. Description of the Prior Arts

The conventional method to detect the contact lens is to provide an accommodating plate and multiple cup bodies on the accommodating plate. Each contact lens is mounted in the cup body. The operator moves the whole accommodating plate to the detecting region, and then a camera lens of the detector detects the contact lens in the cup body. After the detection, the operator manually replaces the cup body with an unqualified contact lens by a cup body with a qualified contact lens. However, the above process has the following shortcomings.

First, the detecting process mainly relies on manual work, such as manually moving the accommodating plate and manually replacing the unqualified contact lens. But manual work is not efficient and is not accurately reliable.

Second, if the detecting process proceeds automatically by machinery, there is still a replacing-unqualified-object process after the detecting process.

To overcome the shortcomings, the present invention provides an automatically cycling detecting-and-sorting device to mitigate or obviate the aforementioned problems.

SUMMARY OF THE INVENTION

The main objective of the present invention is to provide an automatically cycling detecting-and-sorting device that can automatically detect and sort objects, does not need a replacing-unqualified-object process, and can raise efficiency.

The automatically cycling detecting-and-sorting device has a base, multiple accommodating elements, multiple pushing rods, at least one side rod, at least one detector, a cleaning device, and a control system. The base has a feeding region, a sort-and-remove region, a discharging region, a first channel, and a second channel. The feeding region, the sort-and-remove region, and the discharging region are disposed apart from each other from front to rear in sequence. The first channel is connected between the feeding region and the discharging region. The second channel is connected between the feeding region and the discharging region. The first channel and the second channel are disposed apart from each other transversely, and the sort-and-remove region is connected between the first channel and the second channel. The accommodating elements are mounted on a top of the base, and each one of the accommodating elements is for accommodating one object under inspection. The pushing rods are horizontally and movably disposed on the top of the base, push the accommodating elements, and include a first pushing rod, a second pushing rod, at least one third pushing rod, a fourth pushing rod, and a fifth pushing rod. The first pushing rod pushes the accommodating element that is on the second channel through the feeding region to the first channel. The second pushing rod pushes the accommodating element that is on the first channel toward the discharging region. The at least one third pushing rod selectively pushes the accommodating element that is on the first channel through the sort-and-remove region to the second channel. The fourth pushing rod pushes the accommodating element that is on the first channel through the discharging region to the second channel. The fifth pushing rod pushes the accommodating element that is on the second channel toward the feeding region. The at least one side rod is horizontally and movably disposed on the top of the base, pushes the accommodating elements, and includes a first side rod. The first side rod is disposed on the second channel and pushes the accommodating element that is disposed between the discharging region and the sort-and-remove region toward the feeding region. The fifth pushing rod pushes the corresponding accommodating element into a pushing range of the first side rod. The at least one detector is disposed above the first channel, and is disposed between the feeding region and the sort-and-remove region, and the at least one detector is for detecting the object under inspection in the accommodating element that is disposed below the at least one detector and is on the first channel. The cleaning device is disposed on the second channel, is disposed between the sort-and-remove region and the feeding region, and removes the object in the accommodating element that passes by the cleaning device and is on the second channel. The control system is electrically connected to the pushing rods, the at least one side rod, the at least one detector and the cleaning device, and the control system controls the third pushing rod according to a detection outcome of the at least one detector.

When the automatically cycling detecting-and-sorting device as described is in use, the object under inspection is put in the accommodating element on the feeding region. The accommodating element is then pushed to the first channel and conveyed along the first channel. When conveyed along the first channel, the object under inspection in the accommodating element is under the detection of the detector. If passing the detection, the accommodating element keeps being conveyed to the discharging region. The qualified object is taken out when passing the discharging region. Then the empty accommodating element is pushed to the second channel and is conveyed along the second channel. If failing to pass the detection, the accommodating element with the unqualified object is pushed by the corresponding third pushing rod through the sort-and-remove region to the second channel when the accommodating element passes by the sort-and-remove region. Then, the empty accommodating element and the accommodating element with unqualified objects together are pushed toward the feeding region. The cleaning device removes the unqualified object, and then the empty accommodating element is conveyed back to the feeding region to accommodate a new object under inspection, thereby automatically achieving the cycling. Because each object under inspection is accommodated in an individual accommodating element, even though any object in the accommodating element fails to pass the detection, said accommodating element is pushed away individually without affecting the processing of other accommodating elements and objects under inspection. In addition, the whole detecting, sorting and cycling proceed automatically. Thus, the automatically cycling detecting-and-sorting device as described can achieve the purpose of raising efficiency.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
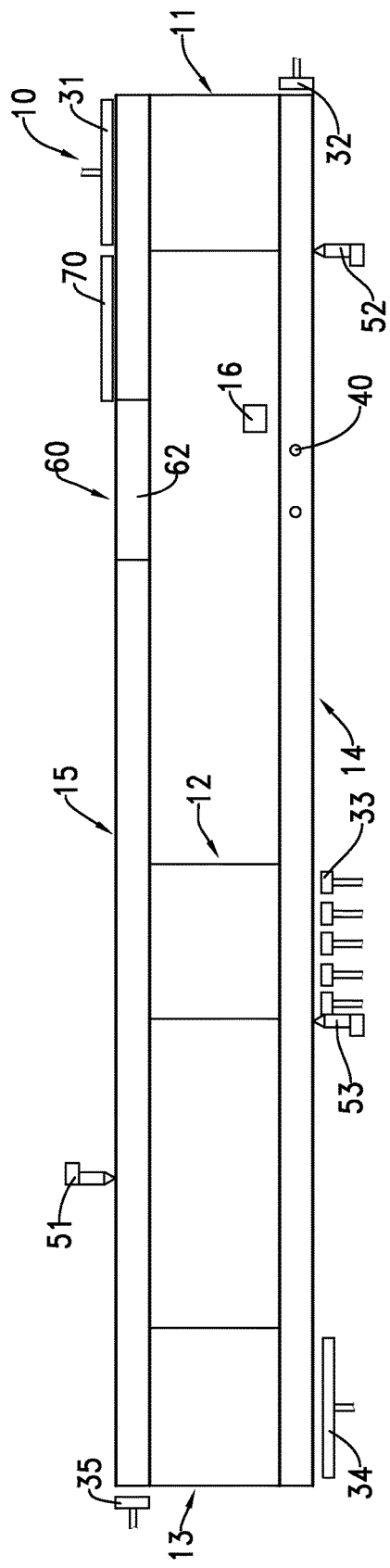
FIG. 1 is a top view of an automatically cycling detecting-and-sorting device in accordance with the present invention, showing a base without accommodating elements.
Figure 2:
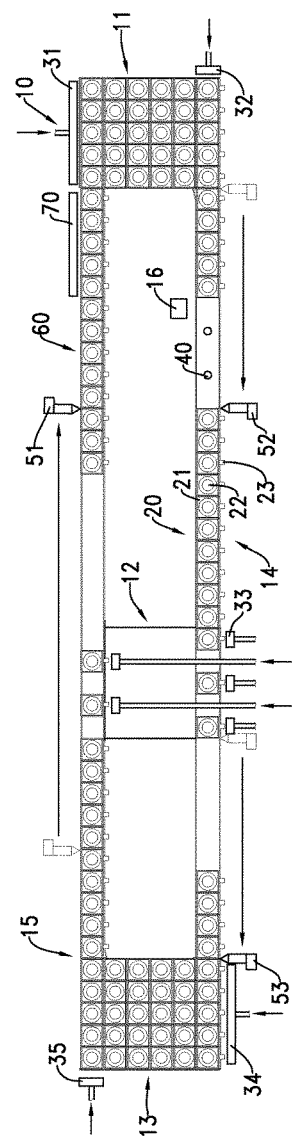
FIG. 2 is a top view of the automatically cycling detecting-and-sorting device in FIG. 1, showing the base with the accommodating elements.
Figure 8:
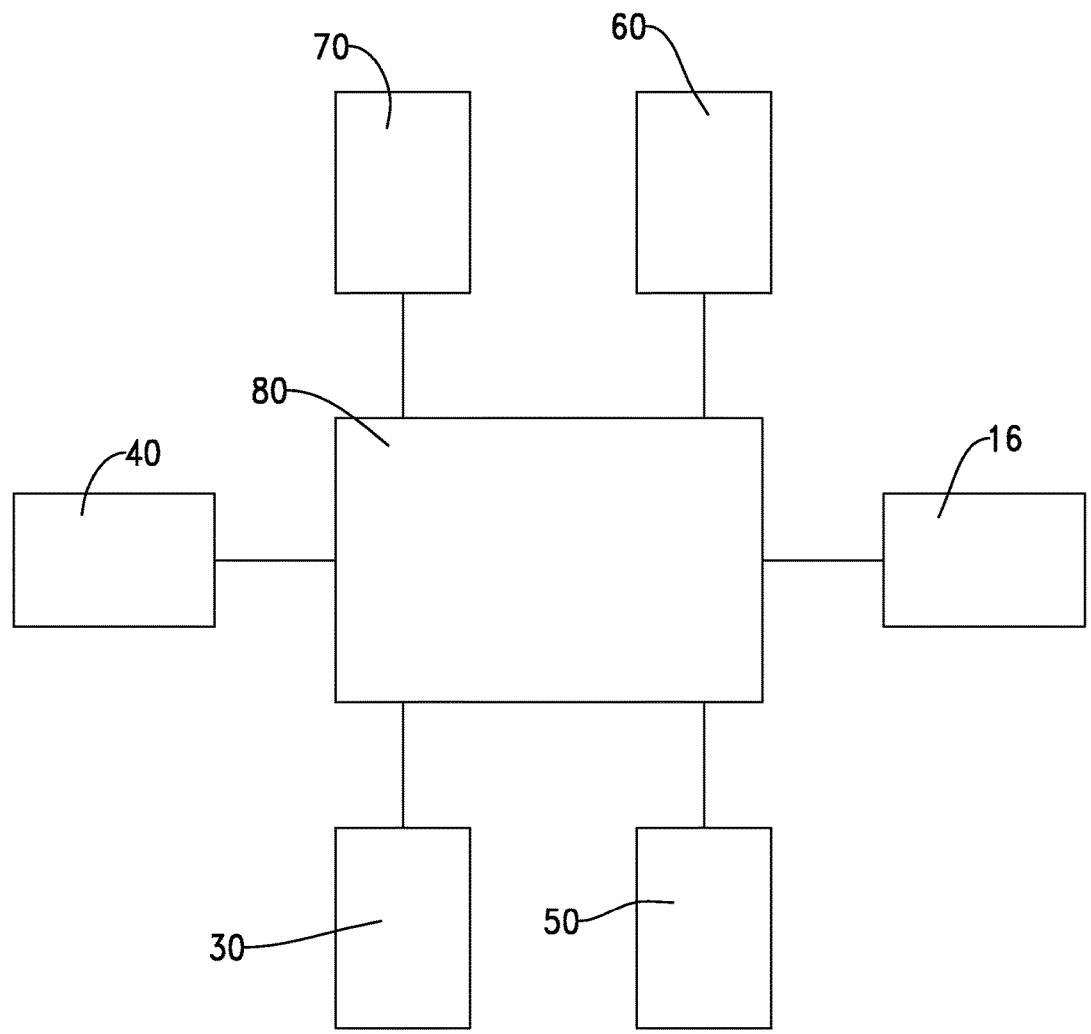
FIG. 8 is a schematic view of a control system of the automatically cycling detecting-and-sorting device in FIG. 1, shown rotated.

With reference to FIGS. 1, 2, and 8, an automatically cycling detecting-and-sorting device in accordance with the present invention comprises a base 10, multiple accommodating elements 20, multiple pushing rods 30, multiple detectors 40, multiple side rods 50, a cleaning device and a control system 80.

The base 10 has a feeding region 11, a sort-and-remove region 12, a discharging region 13, a first channel 14 and a second channel 15. The feeding region 11, the sort-and-remove region 12 and the discharging region 13 are disposed apart from each other from front to rear in sequence. The first channel 14 and the second channel 15 both extend in front-rear, and are both connected between the feeding region 11 and the discharging region 13. The first channel 14 and the second channel 15 are disposed apart from each other transversely. The sort-and-remove region 12 is connected between the first channel 14 and the second channel 15.

Figure 9:
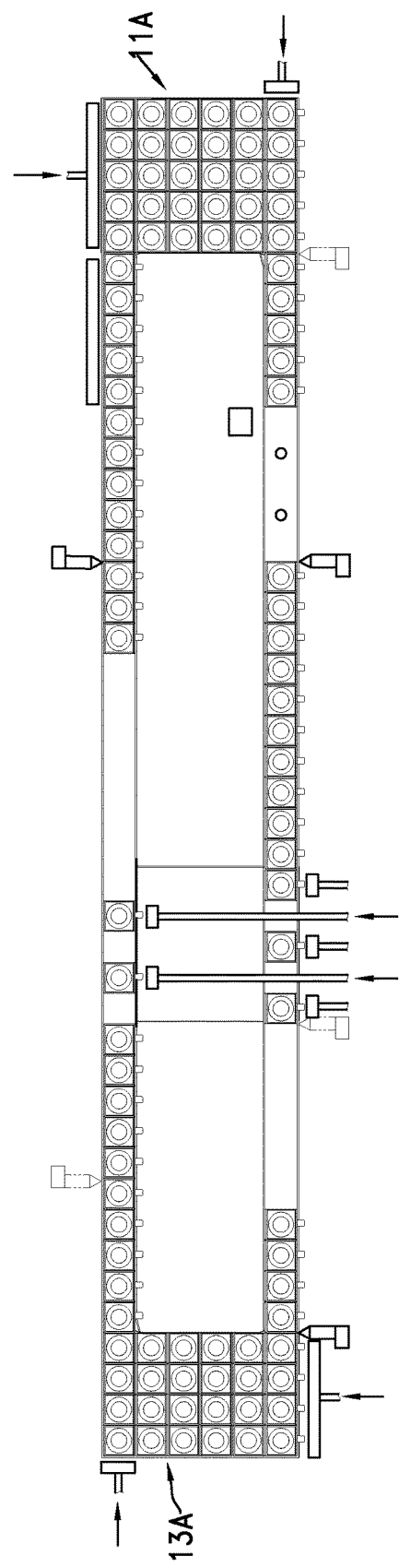
FIG. 9 is a top view of another embodiment of an automatically cycling detecting-and-sorting device in accordance with the present invention.

In a preferred embodiment, the feeding region 11 may be for accommodating multiple rows multiplying multiple columns of the accommodating elements 20, and the discharging region 13 may be for accommodating multiple rows multiplying multiple columns of the accommodating elements 20. But both the first channel 14 and the second channel 15 are only for one row of the accommodating element 20. Therefore, the feeding region 11, the discharging region 13, the first channel 14 and the second channel 15 can transfer a "plane" of the accommodating elements 20 into multiple "rows" of the accommodating elements 20. The rows of the accommodating elements 20 of the feeding region 11 may be the same or different from the rows of the accommodating elements 20 of the discharging region 13 in amount. The columns of the accommodating elements 20 of the feeding region 11 may be the same or different from the columns of the accommodating elements 20 of the discharging region 13 in amount. Taking the embodiment in FIG. 2 for example, the feeding region 11 and the discharging region 13 both comprise five columns multiplying four rows. However, in the embodiment in FIG. 9, the feeding region 11A also comprises five columns multiplying four rows, but the discharging region 13A comprises four columns multiplying four rows. In addition, in a preferred embodiment, the feeding region 11 and the discharging region 13 are connected to transverse sides of the first channel 14 and the second channel 15. But the feeding region 11 and the discharging region 13 also may be connected to ends of the first channel 14 and the second channel 15. The feeding region 11 and the discharging region 13 connecting to the transverse sides or ends of the channels may be adjusted in demand, and may affect the amounts of the rows and the columns.

Figure 3:
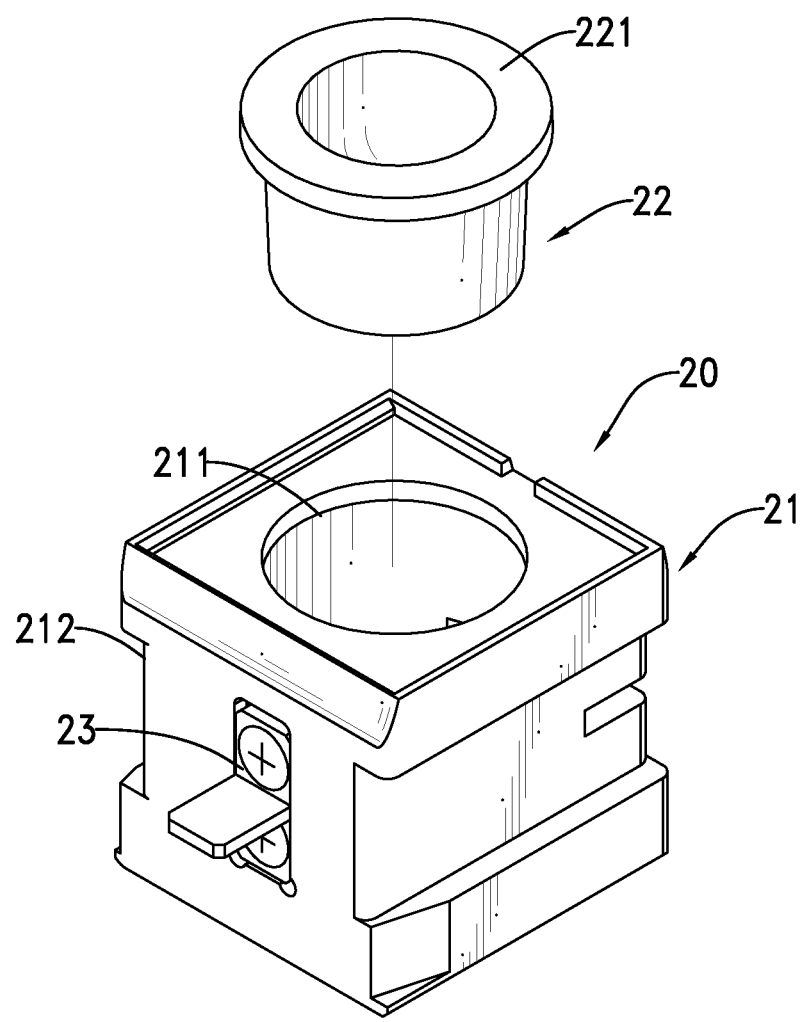
FIG. 3 is a perspective view of the accommodating element of the automatically cycling detecting-and-sorting device in FIG. 1.
Figure 4:
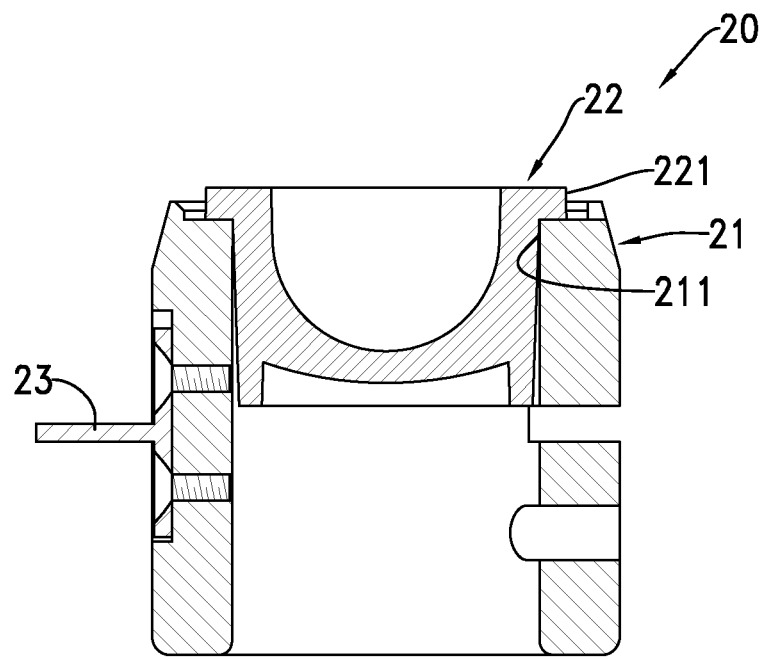
FIG. 4 is a front view in partial section of the accommodating element of the automatically cycling detecting-and-sorting device in FIG. 1.

With reference to FIGS. 3 and 4, the accommodating elements 20 are mounted on a top of the base 10, and are pushed by the pushing rods 30 and the side rods 50. Each accommodating element 20 is for accommodating one object under inspection. In a preferred embodiment, the object under inspection is, but not limited to, a contact lens. Each accommodating element 20 has a seat 21, a cup body 22 and a sensed element 23. The seat 21 has an accommodating hole 211 and two side rod recesses 212. The accommodating hole 211 is formed in a top of the seat 21. The side rod recesses 212 are respectively formed in a front side and a rear side of the seat 21, and extend transversely for the side rod 50 to be inserted into and abut one of the side rod recesses 212. The cup body 22 is mounted in the accommodating hole 211, and has an annular flange 221. The annular flange 221 protrudes around an opening edge of the cup body 22 and abuts on an edge of the accommodating hole 211, such that the cup body 22 is supported. The cup body 22 is made of transparent material, and is for accommodating the object under inspection. A bottom of an inner surface of the cup body 22 is spherical and protrudes downward to fit a shape of the object under inspection. Because the cup body 22 is transparent, spots on the cup body 22 or spots on the object under inspection are easy to be found out under inspection, thereby reducing the chance that the detection outcome is affected by the spots on the cup body 22. The sensed element 23 is mounted on a transverse side of the seat 21. The base 10 further has a sensor 16 disposed on the first channel 14 at a position corresponding to the detector 40 to sense the sensed element 23 of the accommodating element 20. In a preferred embodiment, the sensed element 23 is a metal panel, and the sensor 16 can sense metal. The sensor 16 may be, but not limited to, an optical coupler sensor.

The pushing rods 30 are horizontally and movably disposed on the top of the base 10, and comprise a first pushing rod 31, a second pushing rod 32, multiple third pushing rods 33, a fourth pushing rod 34 and a fifth pushing rod 35. The first pushing rod 31 pushes the accommodating element 20 that is on the second channel 15 through the feeding region 11 to the first channel 14. The second pushing rod 32 pushes the accommodating element 20 that is on the first channel 14 toward the discharging region 13. The third pushing rods 33 selectively push the accommodating element 20 that is on the first channel 14 through the sort-and-remove region 12 to the second channel 15. The fourth pushing rod 34 pushes the accommodating element 20 that is on the first channel 14 through the discharging region 13 to the second channel 15. The fifth pushing rod 35 pushes the accommodating element 20 that is on the second channel 15 toward the feeding region 11.

The detectors 40 are disposed above the first channel 14, and are disposed between the feeding region 11 and the sort-and-remove region 12, and are for detecting the object under inspection in the accommodating element 20 that is disposed below the detectors 40 and is on the first channel 14. The amount of the detector 40 may be only one. In a preferred embodiment, the detector 40 is, but not limited to, a CCD (Charge-coupled Device) detector.

The side rods 50 are horizontally and movably disposed on the top of the base 10, and include a first side rod 51, a second side rod 52 and a third side rod 53. The first side rod 51 is disposed on the second channel 15, and pushes the accommodating element 20 that is disposed between the discharging region 13 and the sort-and-remove region 12 toward the feeding region 11.

The second side rod 52 is disposed above the first channel 14, and pushes the accommodating element 20 that is disposed between the feeding region 11 and the sort-and-remove region 12 toward the sort-and-remove region 12. A pushing distance of the second side rod 52 equals a front-rear length of one accommodating element 20 or a sum of the front-rear lengths of multiple accommodating elements 20. In a preferred embodiment, the pushing distance of the second side rod 52 equals the sum of the front-rear lengths of multiple accommodating elements 20, and preferably equals the sum of the front-rear lengths of five accommodating elements 20 as shown in the figures. A front-rear length of the sort-and-remove region 12 is larger than or equal to the pushing distance of the second side rod 52, and preferably is larger than or equal to the sum of the front-rear lengths of five accommodating elements 20 in the preferred embodiment. An amount of the accommodating element 20 that corresponds to the pushing distance of the second side rod 52 is equal to an amount of the third pushing rods 33. Thus, in the preferred embodiment, the amount of the third pushing rods 33 is five.

The third side rod 53 is disposed above the first channel 14, and pushes the accommodating element 20 that is disposed between the sort-and-remove region 12 and the discharging region 13 toward the discharging region 13.

Figure 5:
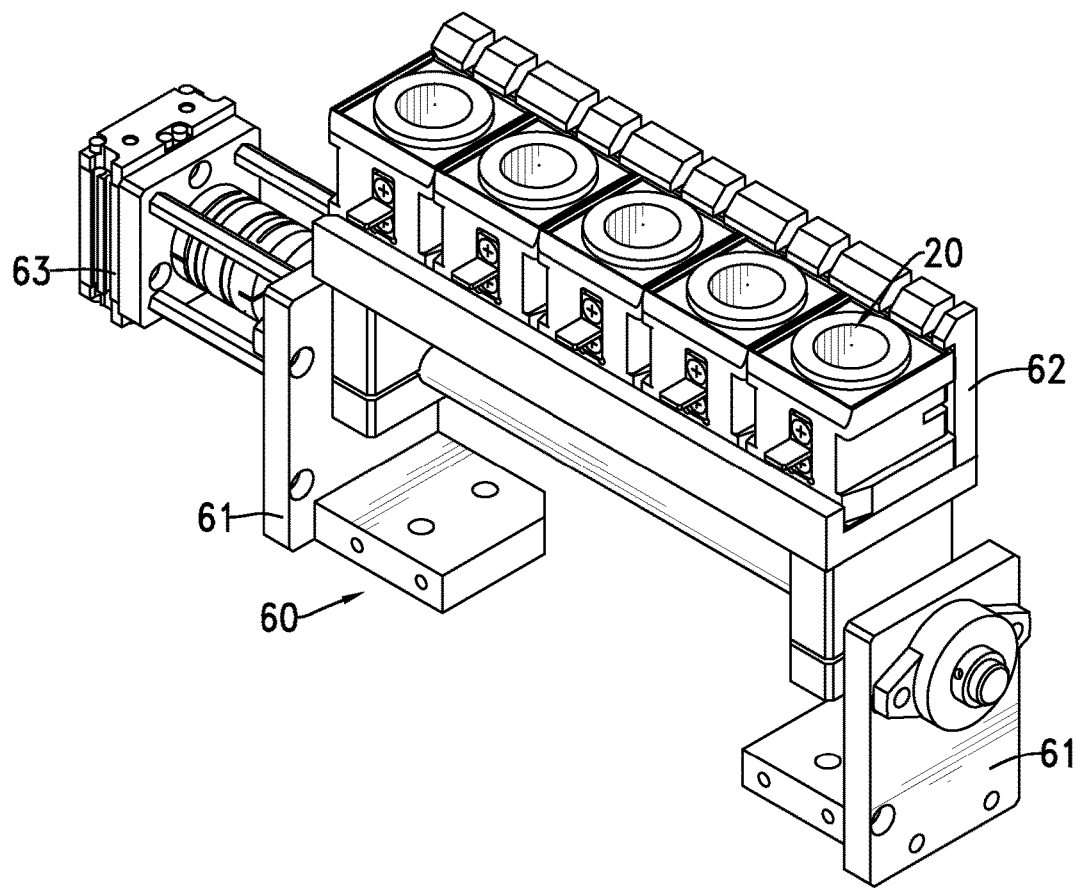
FIG. 5 is a perspective view of a dumping device of the automatically cycling detecting-and-sorting device in FIG. 1.
Figure 6:
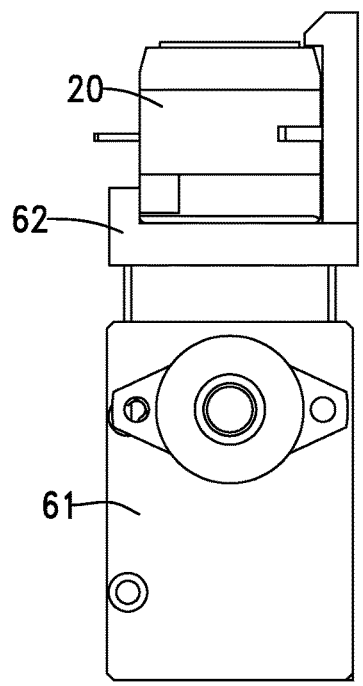
FIG. 6 is a front view of a dumping device of the automatically cycling detecting-and-sorting device in FIG. 1, shown unrotated.
Figure 7:
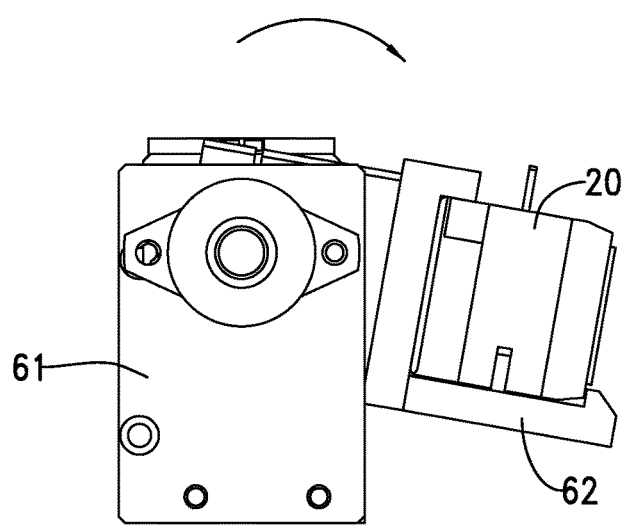
FIG. 7 is a front view of a dumping device of the automatically cycling detecting-and-sorting device in FIG. 1, shown rotated.

With reference to FIGS. 5 to 7, the cleaning device is disposed on the second channel 15, and is disposed between the sort-and-remove region 12 and the feeding region 11 for removing the object in the accommodating element 20 that passes by the cleaning device and is on the second channel 15. In a preferred embodiment, the cleaning device has a dumping device 60 and a pouring device 70. The dumping device 60 has two rotating seats 61, a rotatable channel 62 and a motor 63. The rotating seats 61 are connected securely on the ground or other places. The rotatable channel 62 replaces a part of the second channel 15, and is pivotally connected between the rotating seats 61. The rotatable channel 62 is capable of engaging the accommodating elements 20 in rotating direction. The motor 63 is mounted on one of the rotating seats 61, and rotates the rotatable channel 62. The rotatable channel 62 and the accommodating element 20 are rotated transversely at an angle larger than 90 degrees to dump out the object from the accommodating element 20. Then, the rotatable channel 62 and the accommodating element 20 are rotated back to the original angle.

The pouring device 70 is disposed between the dumping device 60 and the feeding region 11, and pours water or maintenance solution into the accommodating element 20 that is disposed on the second channel 15 and is disposed adjacent to the pouring device 70.

With reference to FIG. 8, the control system 80 is electrically connected to the pushing rods 30, the side rods 50, the sensor 16, the detectors 40, the dumping device 60 and the pouring device 70, and controls the movement of the elements. Preferably, the control system 80 controls the pushing timing of the third pushing rods 33 according to a detection outcome of the detectors 40, the pushing distance of the second side rod 52 and the counting of the sensor 16.

When the automatically cycling detecting-and-sorting device as described is in use, the object under inspection is put in the accommodating element 20 on the feeding region 11. The first pushing rod 31 pushes the accommodating element 20 to the first channel 14, and then the second pushing rod 32 pushes the accommodating element 20 along the first channel 14 into a pushing range of the second side rod 52. Then, the second side rod 52 pushes the accommodating element 20 to pass the detectors 40 and the sensor 16, such that the accommodating element 20 is under the detection of the detector and the sensing of the sensor 16. Because the pushing distance of the second side rod 52 equals the sum of the front-rear lengths of the accommodating elements 20, the control system 80 can determine the passing time and the position of the accommodating element 20 that accommodates unqualified object when said accommodating element 20 is pushed to the sort-and-remove region 12 according to the received information.

If failing to pass the detection, the accommodating element 20 with the unqualified object is pushed by the corresponding third pushing rod 33 through the sort-and-remove region 12 to the second channel 15 when the accommodating element 20 passes by the sort-and-remove region 12.

If the accommodating element passes the detection, the third pushing rod 33 will not move when the accommodating element 20 passes by the sort-and-remove region 12. The accommodating element 20 is pushed by the subsequent accommodating element 20 to pass the sort-and-remove region 12, and then is pushed by the third side rod 53 to the discharging region 13. Afterwards, the accommodating element 20 is pushed by the second channel 15. The qualified object is taken out when passing the discharging region 13. The empty accommodating element 20 is pushed by the fifth pushing rod 35 along the second channel 15 into a pushing range of the first side rod 51. Then, the empty accommodating element 20 and the accommodating element 20 with unqualified object together are pushed by the first side rod 51 toward the feeding region 11, thereby ensuring the accommodating elements 20 abut each other.

Then, the accommodating element 20 passes the dumping device 60 and the pouring device 70 to make sure the accommodating element 20 after passing the dumping device 60 and the pouring device 70 accommodate nothing but water or maintenance solution. Finally, the accommodating element 20 is pushed by the first pushing rod 31 to the feeding region 11 to accommodate a new object under inspection, thereby achieving cycling use of the accommodating element 20. When in the feeding region 11 and in the discharging region 13, the object in the cup body 22 is put in and taken out by, but not limited to, vacuum absorption.

In the above process, even though any object in the accommodating element 20 fails to pass the detection, said accommodating element 20 is pushed away from the first channel 14 when passing the sort-and-remove region 12, and does not affect the processing of other accommodating elements 20 and the objects under inspection. In addition, the whole detecting, sorting and cycling proceed automatically. Thus, the automatically cycling detecting-and-sorting device as described can achieve the purpose of raising efficiency.

In another preferred embodiment, the pushing distance of the second side rod may equal a front-rear length of one accommodating element, and thus the base needs only one third pushing rod, as long as the control system determines the accurate timing to push out and pull back the third pushing rod.

In another preferred embodiment, the accommodating element may be implemented without any sensed element, and the first channel may be implemented without the sensor, as long as the control system calculates a distance between the detector and the third pushing rod and the pushing distance of the second side rod to determine the timing to push out the third pushing rod.

In another preferred embodiment, the feeding region and the discharging region may accommodate only one row of the accommodating elements, as long as the feed-in and removal processes of the object can match the one-row region.

In another preferred embodiment, the accommodating element may be altered in structure other than the above mentioned, as long as the accommodating element can accommodate object and does not interfere with the detection.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automatically cycling detecting-and-sorting device comprising:
   a base having
      a feeding region;
      a sort-and-remove region;
      a discharging region; wherein the feeding region, the sort-and-remove region, and the discharging region are disposed apart from each other from front to rear in sequence;
      a first channel connected between the feeding region and the discharging region; and
      a second channel connected between the feeding region and the discharging region; wherein the first channel and the second channel are disposed apart from each other transversely, and the sort-and-remove region is connected between the first channel and the second channel;
   multiple accommodating elements mounted on a top of the base, and each one of the accommodating elements for accommodating one object under inspection;
   multiple pushing rods horizontally and movably disposed on the top of the base, pushing the accommodating elements, and including
      a first pushing rod pushing the accommodating element that is on the second channel through the feeding region to the first channel;
      a second pushing rod pushing the accommodating element that is on the first channel toward the discharging region;
      at least one third pushing rod selectively pushing the accommodating element that is on the first channel through the sort-and-remove region to the second channel;
      a fourth pushing rod pushing the accommodating element that is on the first channel through the discharging region to the second channel; and
      a fifth pushing rod pushing the accommodating element that is on the second channel toward the feeding region;
   at least one side rod horizontally and movably disposed on the top of the base, pushing the accommodating elements, and including
      a first side rod disposed on the second channel and pushing the accommodating element that is disposed between the discharging region and the sort-and-remove region toward the feeding region; wherein the fifth pushing rod pushes the corresponding accommodating element into a pushing range of the first side rod;
   at least one detector disposed above the first channel, and disposed between the feeding region and the sort-and-remove region, and the at least one detector for detecting the object under inspection in the accommodating element that is disposed below the at least one detector and is on the first channel;
   a cleaning device disposed on the second channel and disposed between the sort-and-remove region and the feeding region; and
   a control system electrically connected to the pushing rods, the at least one side rod, the at least one detector and the cleaning device, and the control system controlling the third pushing rod according to a detection outcome of the at least one detector.

2. The automatically cycling detecting-and-sorting device as claimed in claim 1, wherein the at least one side rod further includes:
   a second side rod disposed above the first channel and pushing the accommodating element that is disposed between the feeding region and the sort-and-remove region toward the sort-and-remove region; wherein a pushing distance of the second side rod equals a front-rear length of one accommodating element or a sum of the front-rear lengths of multiple accommodating elements; wherein an amount of the accommodating element that corresponds to the pushing distance of the second side rod is equal to an amount of the at least one third pushing rod; wherein the second pushing rod pushes the corresponding accommodating element into a pushing range of the second side rod; and
   a third side rod disposed above the first channel and pushing the accommodating element that is disposed between the sort-and-remove region and the discharging region toward the discharging region.

3. The automatically cycling detecting-and-sorting device as claimed in claim 2, wherein
   each one of the accommodating elements has a sensed element;
   the base further has
      a sensor disposed on the first channel to sense the sensed element of the accommodating element, and electrically connecting to the control system; and
   the control system controls the pushing timing of the at least one third pushing rod according to the pushing distance of the second side rod and counting of the sensor.

4. The automatically cycling detecting-and-sorting device as claimed in claim 1, wherein
   the feeding region is for accommodating multiple rows multiplying multiple columns of the accommodating elements; and
   the discharging region is for accommodating multiple rows multiplying multiple columns of the accommodating elements.

5. The automatically cycling detecting-and-sorting device as claimed in claim 4, wherein
- the rows of the accommodating elements of the feeding region differ from the rows of the accommodating elements of the discharging region in amount; and
- the columns of the accommodating elements of the feeding region differ from the columns of the accommodating elements of the discharging region in amount.

6. The automatically cycling detecting-and-sorting device as claimed in claim 1, wherein each one of the accommodating elements has
- a seat having
  - an accommodating hole formed in a top of the seat; and
- a cup body mounted in the accommodating hole, made of a transparent material, and being for accommodating the object under inspection.

7. The automatically cycling detecting-and-sorting device as claimed in claim 6, wherein a bottom of an inner surface of the cup body is spherical and protrudes downward.

8. The automatically cycling detecting-and-sorting device as claimed in claim 1, wherein the accommodating element has
- two side rod recesses respectively formed in a front side and a rear side of the accommodating element for the at least one side rod to be inserted into and abut one of the side rod recesses.

* * * * *